United States Patent
Geerlings et al.

(10) Patent No.: US 10,554,640 B2
(45) Date of Patent: Feb. 4, 2020

(54) METHOD AND SYSTEM FOR FACILITATING SECURE COMMUNICATION

(71) Applicant: NXP B.V., Eindhoven (NL)

(72) Inventors: Jurgen Geerlings, Eindhoven (NL); Ghiath Al-Kadi, Graz (AT); Piotr Polak, Eindhoven (NL)

(73) Assignee: NXP B.V., Eindhoven (NL)

( * ) Notice: Subject to any disclaimer, the term of this patent is extended or adjusted under 35 U.S.C. 154(b) by 333 days.

(21) Appl. No.: 15/181,099

(22) Filed: Jun. 13, 2016

(65) Prior Publication Data
US 2017/0359324 A1 Dec. 14, 2017

(51) Int. Cl.
H04L 29/06 (2006.01)

(52) U.S. Cl.
CPC .................. H04L 63/061 (2013.01)

(58) Field of Classification Search
CPC . H04L 9/00; H04L 9/08; H04L 63/061; H04L 63/0853; H04L 63/06; H04L 9/083; H04L 12/28; H04L 1/00; H04L 41/0873; H04L 41/12; H04L 9/32; H04L 9/3242; H04L 63/123; H04L 2209/20; H04L 2209/80; H04L 9/14; H04L 63/0485; H04L 63/126; H04W 12/04; H04J 1/16; G06F 15/177; G06F 15/173; H04K 1/00; G06Q 20/02; G06Q 20/04; G06Q 20/0855; G06Q 20/12
USPC .... 713/171, 150, 155, 170; 380/44, 278, 30, 380/277; 726/12; 370/242, 395.2, 254; 709/223, 220; 705/78
See application file for complete search history.

(56) References Cited

U.S. PATENT DOCUMENTS

| 5,602,917 A * | 2/1997 | Mueller ............... H04L 9/0841 380/259 |
| 7,353,382 B2 * | 4/2008 | Labrou ................ G06Q 20/02 380/277 |
| 7,822,982 B2 | 10/2010 | Raikar |
| 8,576,727 B2 * | 11/2013 | Diab .................. H04L 41/0873 370/242 |

(Continued)

FOREIGN PATENT DOCUMENTS

JP  2010004420 A  1/2010

OTHER PUBLICATIONS

Challal, Yacine et al; "Group Key Management Protocols: A Novel Taxonomy"; International Journal of Information Technology, vol. 2, No. 1; 14 pages (2005).

(Continued)

Primary Examiner — Thanhnga B Truong

(57) ABSTRACT

According to a first aspect of the present disclosure, a method for facilitating secure communication in a network is conceived, comprising: encrypting, by a source node in the network, a cryptographic key using a device key as an encryption key, wherein said device key is based on a device identifier that identifies a destination node in the network; transmitting, by said source node, the encrypted cryptographic key to the destination node. According to a second aspect of the present disclosure, a corresponding non-transitory, tangible computer program product is provided. According to a third aspect of the present disclosure, a corresponding system for facilitating secure communication in a network is provided.

11 Claims, 4 Drawing Sheets

(56) References Cited

U.S. PATENT DOCUMENTS

| | | | |
|---|---|---|---|
| 8,862,871 B2* | 10/2014 | Ramanujan | H04L 9/0847 |
| | | | 380/30 |
| 2008/0080708 A1* | 4/2008 | McAlister | H04L 9/0822 |
| | | | 380/44 |
| 2009/0327690 A1* | 12/2009 | Landfeldt | H04L 63/06 |
| | | | 713/150 |
| 2010/0161982 A1 | 6/2010 | Oh et al. | |
| 2014/0164785 A1 | 6/2014 | Ochiai et al. | |

OTHER PUBLICATIONS

EP 15164793.0, Method and System for Securing Data Communicated in a Network, not yet published; 22 pages (Apr. 23, 2015).
Extended European Search Report for application 15170940.9 (dated Aug. 14, 2015).

* cited by examiner

METHOD AND SYSTEM FOR FACILITATING SECURE COMMUNICATION

FIELD

The present disclosure relates to a method for facilitating secure communication in a network. Furthermore, the present disclosure relates to a corresponding non-transitory, tangible computer program product and to a corresponding system for facilitating secure communication in a network.

BACKGROUND

Today, electronic devices are often networkable devices. That is to say, such devices may often be incorporated into wired networks, such as Ethernet, or into wireless networks, such as cellular networks, ZigBee networks, Bluetooth networks and Wi-Fi networks. Another example of a network of devices is an in-vehicle network. Networkable devices may transmit a large amount of data to each other over wired or wireless communication channels. In order to protect the transmitted data, the data are often encrypted. For example, they may be encrypted by performing a cryptographic algorithm which takes a cryptographic key and said data as inputs, or, in other words, the data may be encrypted with the cryptographic key. An example of such a cryptographic algorithm is the so-called Advanced Encryption Standard (AES) algorithm. In case of symmetric-key cryptographic algorithms, the cryptographic key is a secret key which is shared between the source node and the destination node involved in a data transmission. This secret key is often referred to as a master key. It may be desirable to protect this master key when it is distributed to network nodes, e.g., in a destination-node commissioning procedure which precedes the deployment of the master key.

SUMMARY

According to a first aspect of the present disclosure, a method for facilitating secure communication in a network is conceived, comprising: encrypting, by a source node in the network, a cryptographic key using a device key as an encryption key, wherein said device key is based on a device identifier that identifies a destination node in the network; transmitting, by said source node, the encrypted cryptographic key to the destination node.

In one or more embodiments, the method further comprises decrypting, by the destination node, the encrypted cryptographic key using the device key as a decryption key.

In one or more embodiments, the method further comprises acknowledging, by the destination node, receipt of the cryptographic key by encrypting the device key using the cryptographic key as an encryption key and transmitting the encrypted device key to the source node.

In one or more embodiments, the source node is a network gateway.

In one or more embodiments, the cryptographic key is a secret master key.

In one or more embodiments, the device identifier is a unique serial number of the destination node.

In one or more embodiments, the device key is the same as the device identifier.

In one or more embodiments, the device key comprises the device identifier and one or more padding bits.

In one or more embodiments, the device key comprises the device identifier and at least one copy of the device identifier.

In one or more embodiments, the device key has been generated by executing a predefined one-way function that takes at least the device identifier as an input parameter.

In one or more embodiments, the method further comprises storing the device key in a memory unit of the source node, such that the source node may authenticate the destination node by means of said device key after an arbitrary amount of time has elapsed.

According to a second aspect of the present disclosure, a non-transitory, tangible computer program product is provided, comprising instructions which, when being executed by a processing unit, cause said processing unit to carry out or control a method of the kind set forth.

According to a third aspect of the present disclosure, a system for facilitating secure communication in a network is provided, said system comprising a source node which is arranged to: encrypt a cryptographic key using a device key as an encryption key, wherein said device key is based on a device identifier that identifies a destination node in the network; transmit the encrypted cryptographic key to the destination node.

In one or more embodiments, the system further comprises the destination node, wherein said destination node is arranged to decrypt the encrypted cryptographic key using the device key as a decryption key.

DESCRIPTION OF DRAWINGS

Embodiments will be described in more detail with reference to the appended drawings, in which.

DESCRIPTION OF EMBODIMENTS

Figure 1:
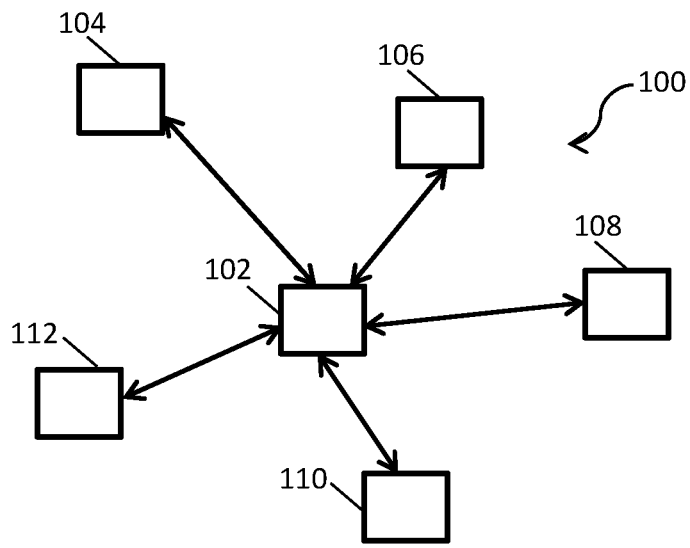
FIG. 1 shows an example of a network.

FIG. 1 shows an example of a network 100. In particular, it shows an example of a network of devices 102, 104, 106, 108, 110, 112. The devices 102, 104, 106, 108, 110, 112 may be connected to each other via wired communication channels (e.g., in Ethernet networks) or wireless communication channels (e.g., in cellular networks, ZigBee networks, Bluetooth networks, Wi-Fi networks). The network comprises a source node 102 and a plurality of destination nodes 104, 106, 108, 110, 112. The source node 102 may communicate data to each destination node 104, 106, 108, 110, 112 via said wired or wireless communication channels. The source node 102 may be a network gateway, for example. In order to protect the data that is communicated between the source node 102 and the destination nodes 104, 106, 108, 110, 112, the data is often encrypted by means of an encryption function that takes said data and a cryptographic key as input parameters. The destination nodes 104, 106, 108, 110, 112 should then decrypt the data by means of a decryption function that takes the received encrypted data and a corresponding cryptographic key as input parameters. For example, the encryption and decryption functions may be based on an AES algorithm, which is a symmetric-key algorithm. In that case, the cryptographic key (input to the encryption function) is the same as the corresponding cryptographic key (input to the decryption function). Before data can be decrypted by a destination node, the cryptographic key should be made available to said destination node. In order to prevent security hazards during the master key exchange, it may be desirable to achieve this in a simple, yet secure manner. Therefore, in accordance with the present disclosure, a method is provided for facilitating secure communication in a network. This may be useful in many kinds of networks, such as Ethernet, ZigBee networks, Bluetooth Wi-Fi, and in-vehicle networks.

Figure 2:
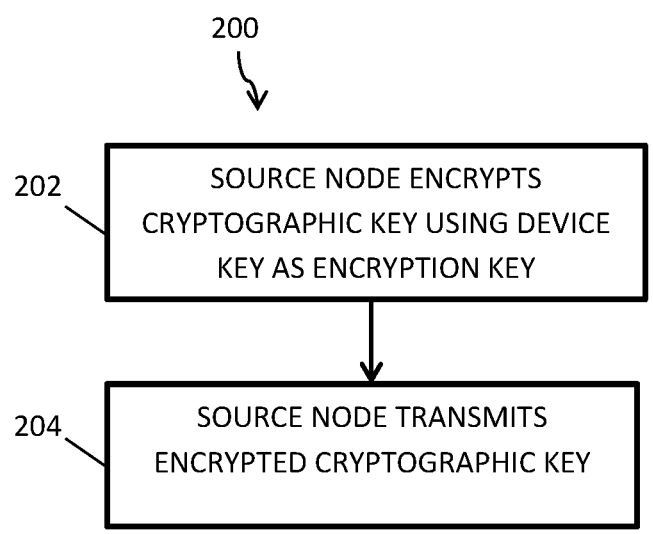
FIG. 2 shows an illustrative embodiment of a method for facilitating secure communication.

FIG. 2 shows an illustrative embodiment of a method 200 for facilitating secure communication. The method 200 comprises, at 202, encrypting, by a source node in the network, a cryptographic key using a device key as an encryption key, wherein said device key is based on a device identifier that identifies a destination node in the network. Furthermore, the method comprises, at 204, transmitting, by said source node, the encrypted cryptographic key to the destination node. Since the device identifier is already present in, or easily accessible to, the destination node (e.g., it may reside in a memory unit of said node), one of the ingredients required for the decryption process is readily available. A particularly efficient implementation may be realized if the device key is the same as the device identifier. In that case, the destination node may simply use the device identifier as a decryption key for decrypting the encrypted cryptographic key. However, even if some computations need to be performed in order to derive the device key from the device identifier, the use of the identifier may still enable a relatively efficient process. The device identifier may for example be the unique serial number of the destination node, in which case the device key may also be regarded as unique, thus offering a high level of security. It is noted that the device identifier does not need to be a fixed number; it may also be an attribute of the destination node, or unique but changing data associated with said node, which may serve to identify it.

Figure 3:
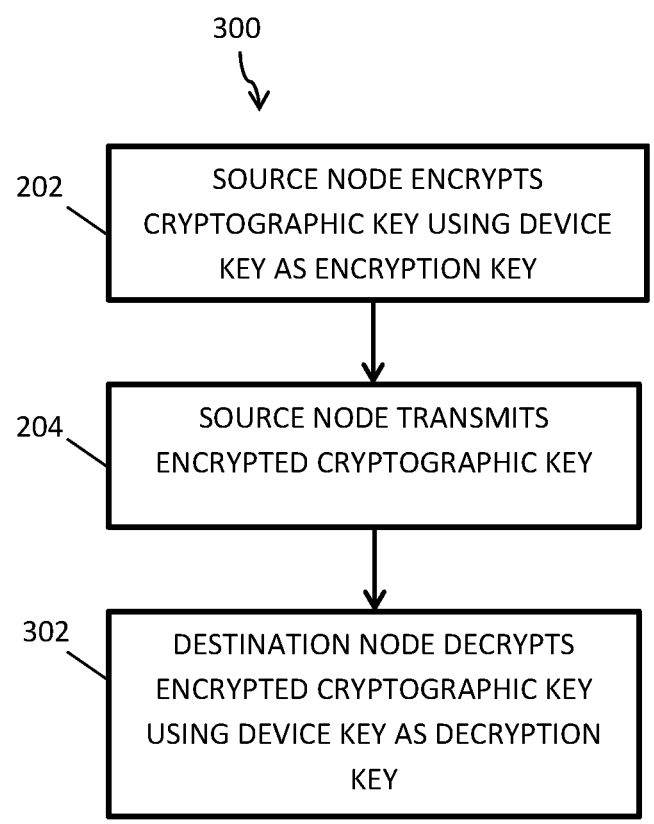
FIG. 3 shows a further illustrative embodiment of a method for facilitating secure communication.

FIG. 3 shows a further illustrative embodiment of a method 300 for facilitating secure communication. In addition to the steps shown in FIG. 2, the method 300 comprises, at 302, a step wherein the destination node decrypts the encrypted cryptographic key using the device key as a decryption key. This embodiment may enable a particularly efficient implementation in case a symmetric-key algorithm is used for encrypting the cryptographic key.

Figure 4:
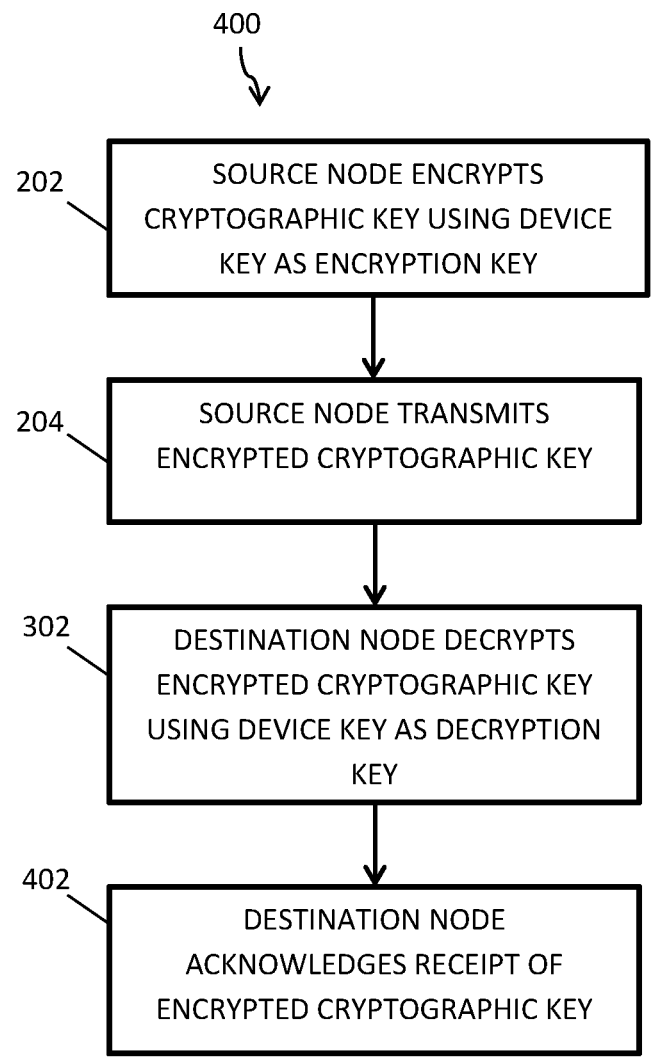
FIG. 4 shows a further illustrative embodiment of a method for facilitating secure communication.

FIG. 4 shows a further illustrative embodiment of a method 400 for facilitating secure communication. In addition to the steps shown in FIG. 3, the method 400 comprises, at 402, a step wherein the destination node acknowledges receipt of the encrypted cryptographic key. Thus, the source node receives a confirmation that the destination node will be able to decrypt data that has been encrypted with the cryptographic key, and thus the source node may start encrypting data with said cryptographic key. A relatively efficient acknowledgement process may be realized by encrypting the device key, which is readily available to the destination node, using the cryptographic key as an encryption key and transmitting the encrypted device key to the source node. The source node may then simply decrypt the received encrypted device key using the cryptographic key (which is readily available to the source node) as a decryption key. If the result of the decryption matches the device key used in step 202, then the source node may safely assume that the destination node possesses the correct cryptographic key.

As mentioned above, the device key may be the same as the device identifier, which may result in a particularly efficient implementation. In that case, it may also be relatively easy to provide the device key to the source node. For example, the device key/identifier may be included in a bar code or QR-code attached to the destination node, and the source node may include a reader device which is arranged to read the device key/identifier from said bar code or QR-code. Alternatively, but without limitation, the device key/identifier may be input by an end-user through a user interface of the source node, or the device key/identifier may be read from an NFC tag comprised in or attached to the destination node. It is also possible that the user uses a mobile phone to scan the QR-code of the destination node and passes on the device identifier to the source node via NFC, for example. The use of an NFC tag may also enable providing a more complex device key to the source node. For example, the destination node may perform some computations on the device identifier and store the resulting device key in its NFC tag. For instance, such computations may be necessary if the device identifier size is smaller than the required encryption/decryption key size. In that case, many different techniques can be used to transform a small word to a larger word that matches the required key size; one such technique is padding. Padding bits may be added to the device identifier in order to increase its length; the resulting device key thus contains the device identifier and one or more padding bits. Alternatively or in addition, the device identifier may be repeated at least once in order to generate the device key. For example, if the device identifier has a length of 32 bits, and the required encryption/decryption key size is 128 bits, the device identifier may be repeated three times; the resulting device key thus contains the device identifier and three copies of the device identifier. The method that is used for padding should be known to both the source node and the destination node. In some embodiments, the device key may also contain the device identifier, at least one copy of the device identifier and one or more padding bits. In other embodiments, the device key may be generated by means of more complex procedures which may achieve a high level of security. An example of such a procedure is shown in FIG. 5.

It is noted that, in some embodiments, if the device key is not the same as the device identifier, the computations required for computing the device key may be performed only by the destination node. In that case, the destination node should make the device key available to the source node. In other embodiments, only the device identifier may be provided to the source node. In those embodiments, if the device key is not the same as the device identifier, the source node may perform the computations required for generating the device key. In that case, however, the destination node should perform the same computations on its device identifier. The details of the computation algorithm should therefore be shared between the source node and the destination node. For example, this may be done in a first phase of a destination-node commissioning procedure. In a subsequent phase, the device key may then be computed both by the source node and the destination node.

Figure 5:
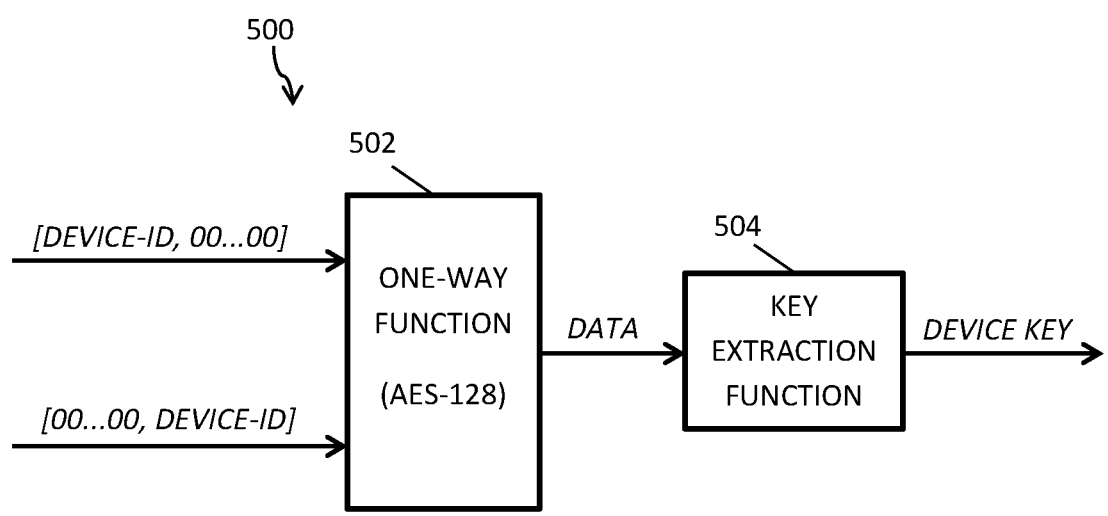
FIG. 5 shows an illustrative embodiment of a method for generating a device key.

FIG. 5 shows an illustrative embodiment of a method 500 for generating a device key. The method 500 comprises executing a one-way function 502, such as an AES-128 encryption function, that takes two values as input parameters. The first value comprises the device identifier (e.g., a unique serial number) in a most significant bits portion, and a sequence of padding bits (in this case, zeros) in a least significant bits portion. The second value comprises a sequence of padding bits (in this case, zeros) in a most significant bits portion, and the device identifier in a least significant bits portion. The one-way function 502 returns data whose size may not match the required encryption/decryption key size. In that case, a key extraction function 504 may be executed. The key extraction function 504 extracts a device key from the data generated by the one-way function 502.

In some embodiments, the device key may be stored in a memory unit of the source node, such that the source node may authenticate the destination node by means of said device key after an arbitrary amount of time has elapsed. In particular, if the source node (e.g., a network gateway) determines that a destination node, which already forms part of the network, behaves in an unexpected manner, the source node may authenticate the destination node by (i) retrieving the device key from its memory unit and by (ii) sending a message encrypted with said device key to the destination node. If the destination node succeeds in replying to the encrypted message, it may be concluded that it possessed the correct device key, and the source node may safely assume that the destination node is genuine. When the destination node fails to reply, it may be disconnected from the network or other suitable measures may be taken. The encrypted message may be sent several times (i.e., two or more trials), and the destination node may be disconnected only if it fails to reply to each encrypted message, for example.

The systems and methods described herein may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 network
102 source node
104 destination node
106 destination node
108 destination node
110 destination node
112 destination node 200 method for facilitating secure communication
202 source node encrypts cryptographic key using device key as encryption key
204 source node transmits encrypted cryptographic key
300 method for facilitating secure communication
302 destination node decrypts encrypted cryptographic key using device key as decryption key
400 method for facilitating secure communication
402 destination node acknowledges receipt of encrypted cryptographic key
500 method for generating a device key
502 one-way function
504 key extraction function

The invention claimed is:

1. A method for facilitating secure communication in a network, comprising:
   generating a device key based upon a device identifier and a sequence of padding bits;
   encrypting, by a source node in the network, a cryptographic key using the device key as an encryption key, wherein the device identifier has unique but changing data that identifies a destination node in the network; and
   transmitting, by said source node, the encrypted cryptographic key to the destination node.

2. The method as claimed in claim 1, further comprising:
   decrypting, by the destination node, the encrypted cryptographic key using the device key as a decryption key.

3. The method as claimed in claim 2, further comprising:
   acknowledging, by the destination node, receipt of the cryptographic key by encrypting the device key using the cryptographic key as an encryption key; and
   transmitting the encrypted device key to the source node.

4. The method as claimed in claim 1, wherein the source node is a network gateway.

5. The method as claimed in claim 1, wherein the cryptographic key is a secret master key.

6. The method as claimed in claim 1, wherein the device identifier is a unique serial number of the destination node.

7. The method as claimed in claim 1, wherein the device key has been generated by executing a predefined one-way function that takes the device identifier and the sequence of padding bits as input parameters.

8. The method as claimed in claim 1, further comprising:
   storing the device key in a memory unit of the source node, such that the source node may authenticate the destination node by means of said device key after an arbitrary amount of time has elapsed.

9. A non-transitory, tangible computer medium comprising instructions which, when being executed by a processing unit, cause said processing unit to carry out or control a method for facilitating secure communication in a network, the non-transitory, tangible computer medium comprising:
   instructions for generating a device key based upon a device identifier and a sequence of padding bits;
   instructions for encrypting, by a source node in the network, a cryptographic key using the device key as an encryption key, wherein the device identifier has unique but changing data that identifies a destination node in the network; and
   instructions for transmitting, by said source node, the encrypted cryptographic key to the destination node.

10. A system for facilitating secure communication in a network, said system comprising:
    a source node which is configured to encrypt a cryptographic key using a device key as an encryption key, wherein said device key is generated based on a device identifier having unique but changing data that identifies a destination node in the network, and a sequence of padding bits, and transmit the encrypted cryptographic key to the destination node.

11. The system as claimed in claim 10, further comprising the destination node, wherein said destination node is configured to decrypt the encrypted cryptographic key using the device key as a decryption key.

* * * * *